United States Patent [19]

Siol et al.

[11] Patent Number: 5,047,481

[45] Date of Patent: Sep. 10, 1991

[54] COMPATIBLE POLYMER BLENDS

[75] Inventors: Werner Siol, Darmstadt; Ulrich Terbrack, Reinheim, both of Fed. Rep. of Germany

[73] Assignee: Röhm GmbH Chemische Fabrik, Darmstadt, Fed. Rep. of Germany

[21] Appl. No.: 355,497

[22] Filed: May 23, 1989

Related U.S. Application Data

[62] Division of Ser. No. 96,472, Sep. 15, 1987, Pat. No. 4,898,912.

[30] Foreign Application Priority Data

Sep. 24, 1986 [DE] Fed. Rep. of Germany ....... 3632369

[51] Int. Cl.$^5$ ...................... C08L 45/00; C08L 33/06
[52] U.S. Cl. ................................ 525/216; 525/227
[58] Field of Search ................................ 525/216, 227

[56] References Cited

U.S. PATENT DOCUMENTS

| | | | |
|---|---|---|---|
| 2,941,977 | 6/1960 | Roche et al. | 525/227 |
| 3,009,895 | 11/1961 | Slocombe | 525/222 |
| 3,297,794 | 1/1967 | Imai et al. | 525/260 |
| 3,629,211 | 12/1971 | Nozaki | 525/227 |
| 4,165,308 | 8/1979 | Serlin | 525/222 |
| 4,849,479 | 7/1989 | Siol et al. | 525/227 |

Primary Examiner—Marion C. McCamish
Assistant Examiner—Susan Berman
Attorney, Agent, or Firm—Oblon, Spivak, McClelland, Maier & Neustadt

[57] ABSTRACT

The invention relates to compatible polymer blends comprised of a polymer component containing cyclohexyl (meth)acrylate as a monomer, and further comprised of a polymer component containing styrene as a monomer.

16 Claims, 2 Drawing Sheets

COMPATIBLE POLYMER BLENDS

This is a division of application Ser. No. 07/096,472, filed on Sept. 15, 1987, now U.S. Pat. No. 4,898,912.

BACKGROUND OF THE INVENTION

1. Field of the Invention

The invention relates to compatible polymer blends comprised of a polymer component containing cyclohexyl (meth)acrylate as a monomer, and further comprised of a polymer component containing styrene as a monomer.

2. Discussion of the Background

As a rule, different polymer species are considered to be incompatible; i.e., down to very small concentrations of one of the components, different polymer species do not form homogeneous phases, such as can be characterized by complete miscibility of the components.

Certain exceptions to this rule are of increasing interest and importance, particularly among scientists and engineers concerned with the theoretical significance of the phenomenon. Fully compatible blends of polymers show complete solubility (miscibility) in all mixing ratios.

A comprehensive presentation of miscible polymer systems is found in, e.g., Paul, D. R. et al., 1978, *Polymer & Engineering Sci.*, 18, 16:1225-34; and *J. Macromol. Sci. - Rev. Macromol. Chem. C.*, 18, 1:109-68 (1980).

To demonstrate miscibility, the glass temperature Tg or the so-called "optical method" (clarity of a film produced by film casting from a solution of the polymer blend) is often employed. See Brandrup and Immergut, "Polymer Handbook", 2nd Ed., III:211-213. An additional test for miscibility of different polymers is the existence of a lower critical solution temperature (LCST). (See German Patent Applications P 34 36 476.5 and P 34 36 477.3.) The existence of a LCST involves a phenomenon wherein as a clear, homogeneous polymer blend is heated it separates into phases and becomes optically turbid or opaque. According to the literature, this behavior is unambiguous proof that the original polymer blend was comprised of a single homogeneous phase at equilibrium Examples of miscibility are, e.g., the systems polyvinylidene fluoride/polymethyl methacrylate and polyvinylidene fluoride/polyethyl methacrylate (U.S. Pat. Nos. 3,253,060, 3,458,391, and 3,459,843). More recent results concerning "polymer blends" and their applicability have been reported by Robeson, L. M., 1984, *Polym. Engineering & Sci.*, 24 8:587-97.

Styrene/maleic anhydride copolymers, and styrene/acrylonitrile copolymers, are compatible with polymethyl methacrylate ("PMMA") under certain conditions (Ger. OS 20 24 940). Improved service properties are claimed for molding compounds of this type. Also, polymethacrylates are compatible in certain blends with copolymers of styrene and monomers with hydroxy functions which promote formation of hydrogen bonds; e.g., copolymer of styrene and p-(2-hydroxyhexafluoroisopropyl)styrene (Min, B. Y., and Pearce, Eli M., 1981, *Org. Coatings and Plast. Chem.*, 45:58-64); or e.g., copolymers of styrene and allyl alcohol (Cangelosi, F., and Shaw, M. T., 1983, Am. Chem. Soc. Div. Polym. Chem. *Polymer Preprints*, 24:258-9).

Polystyrene itself and other styrene-containing polymers are considered not compatible with PMMA. Thus, a miscibility of PMMA (m.w. 160,000) Of only 3.4 ppm in polystyrene, and only 7.5 ppm for PMMA of molecular weight 75,000 in polystyrene, is reported by Shaw, M. T., and Somani, R. H., 1984, Adv. Chem. Ser., No. 206, "Polym. Blends Compos. Multiphase Syst.", pp. 33-42 (Chem. Abstr. 101:73417e). Even relatively low molecular weight polystyrene is relatively incompatible with PMMA. Thus, a mixture of 20% of a very low molecular weight styrene oligomer (m.w. 3,100) in PMMA no longer gives a clear product. Polystyrene with an equally quite low molecular weight of 9,600 is merely translucent at 5% solution in PMMA (Parent, Raymond R., and Tompson, Edward V., 1978, *J. Polym. Sci., Polym. Phys. Ed.*, 16, 1829-47).

Other polymethacrylates and polyacrylates similarly do not form transparent polymer blends with polystyrene These include polyethyl methacrylate, polybutyl methacrylate, polyisobutyl methacrylate, polyneopentyl methacrylate, polyhexyl methacrylate, and many others. See also Somani, R. H., and Shaw, M. T., 1981, *Macromol.*, 14, 1549-54. Mechanical mixtures of polymers (polyblends) have led to plastic products with improved properties, in certain cases and in certain areas of the plastics industry (see Kirk-Othmer, 3rd Ed., J. Wiley, Vol. 18, 1982, pp. 443-78). The physical properties of such "polyblends" ordinarily represent a compromise, which can mean an overall improvement compared with the properties of the individual polymers. Under these circumstances, multiphase polymer mixtures have achieved greater commercial importance than compatible blends (see Kirk-Othmer, loc. cit., p. 449).

Multiphase and compatible polymer mixtures must therefore be kept strictly separate with regard to their physical properties as well as other properties relevant to application technology in particular their optical properties (transparence, clarity, etc.). As mentioned above, when it is sought to produce blends of plastics to yield an improved overall spectrum of properties, compatibility limitations often intervene. This appeared to be the situation for the two polymer classes of polystyrenes and polyalkyl (meth)acrylates. (See Kruse, W. A. et al., 1976, *Makromol. Chem.*, 177, 1145; and Somani, R. H., and Shaw, M. T., loc. cit.)

SUMMARY OF THE INVENTION

Accordingly, one object of the present invention is to provide a compatible polymer blend with improved overall properties and without compatibility limitations.

This and other objects of the invention which will become apparent from the following specification have been achieved by the present compatible polymer blend which comprises:

(i) 0.1-99.9 wt. % of a first polymer comprising at least 20 wt. % and up to a 100 wt. % styrene monomer units; and (ii) 99.9-0.1 wt. % of a second polymer comprising at least 10 wt. % and up to a 100 wt. % of a monomer unit of the formula (I)

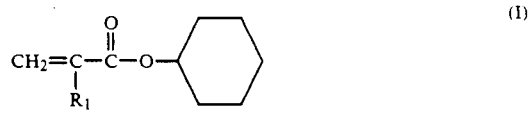

wherein $R_1$ l is hydrogen or methyl.

The invention is also directed to objects made from these compatible polymer blends.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 3:
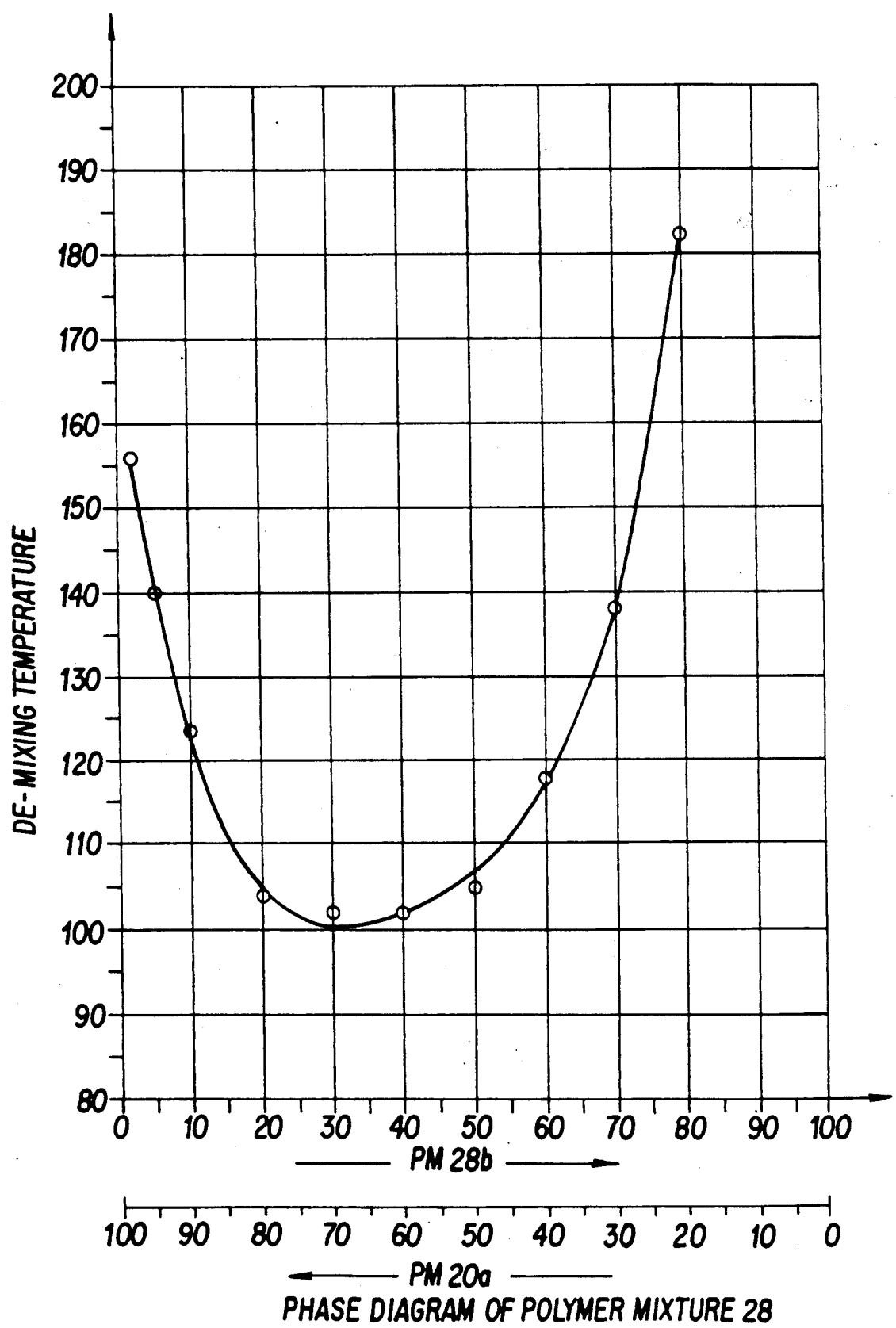
FIG. 3 shows a phase diagram for Example 28.

It has been discovered, in connection with the present invention, that surprisingly, blends of polystyrene and polycyclohexyl methacrylate or polycyclohexyl acrylate are compatible. Accordingly, the present invention relates to compatible polymer blends "PM" comprised of two different polymer components, Polymer P1 and Polymer P2, as follows:

A) Polymer P1 being a polystyrene comprised at least 20% and up to a 100% by weight of units of styrene (the balance to a 100% by weight being formed by monomers copolymerizable with styrene), Polymer P1 being present in the blend in the amount of 0.1-99.9 wt. %, preferably 1-99 wt. %, particularly 2-98 wt. %, more particularly 5-95 wt. %, and still more particularly 20-80 wt. %; and B) Polymer P2 being a poly(meth)acrylate comprised at least 10% and up to a 100% by weight of monomer units of formula I:

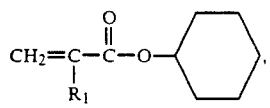

(I)

where $R_1$ represents hydrogen or methyl (the balance to a 100% by weight of the monomers being formed by monomers copolymerizable with the monomers of formula I), Polymer P2 being present in the blend in the amount of 99.9-0.1 wt. %, preferably 99-1 wt. %, particularly 98-2 wt. %, more particularly 95-5 wt. %, and still more particularly 80-20 wt. %.

Of particularly interest is a polymer blend primarily comprising styrene units, i.e., in the amount of >50 wt. %, e.g., polystyrene. Preferably the sum of polymer components according to (A) and (B) is 100% of the total amount of polymers in the blend. However, under certain conditions the blend may be processed together with additional polymers. The fact that the inventively produced blends of the polystyrene according to (A) and the poly(meth)acrylate according to (B) are compatible is particularly surprising in that as a rule polystyrenes do not form compatible blends with other polymethacrylates and polyacrylates.

It has been discovered that the present blends show such food compatibility of their components that demixing does not even occur at temperatures of 200° C. and higher. In particular one might mention the polymer blend "PM1", comprised of polystyrene (A) and polycyclohexyl (meth)acrylate (B).

This blend "PM1" shows excellent compatibility of its components, and allows substantial variation in proportions as well as in mixture components. This is particularly true when the polymer P1 is pure polystyrene. Thus, the polymer component (B) can be varied substantially by copolymerization with suitable monomers. Also, the polymer component (A) can be varied within certain bounds by copolymerization with suitable monomers, without compatibility being lost. Suitable comonomers for component (B) are (meth)acrylic acid esters, generally of non-alicyclic alcohols with 1-12 carbon atoms, particularly alkanols. In addition, suitable comonomers include (meth)acrylic acid esters of cyclic alcohols having 4, 5, 7, 8, 9, 10, 11 or 12 carbon atoms in the ring, which may also be substituted; e.g. with C1-C4 alkyl substituents these are in addition to the (meth)acrylic acid esters of substituted cyclohexanols mentioned above.

There are other candidates for comonomers copolymerizable with cyclohexyl (meth)acrylate. These include, in particular methyl methacrylate. The proportion of cyclohexyl acrylate and/or cyclohexyl methacrylate in the polymer component (B) is as a rule in the range 100-10 wt. %, preferably 90-20 wt. %, and particularly 80-30 wt. %. Thus, according to the invention it is possible to substitute permissible monomers from among Formula I on the one handside with monomers permissible from among Formula II:

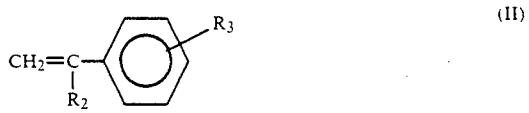

(II)

where $R_2$ represents hydrogen or methyl, and $R_3$ represents an alkyl group $C_nH_{2n+1}$ with n=1 to 8, on the other and vice versa. Thus the styrene in the polymer (A) can be replaced by p-methylstyrene monomer units, to a small extent, e.g., 10 wt. %. The styrene may also be replaced to an extent by other alkyl-substituted in particular C1-C4 alkyl substituted styrenes, e.g., m-methylstyrene, p-tert-butylstyrene, and α-methylstyrene. As a rule, the proportion of these monomers is less than 20 wt. %. Styrene may also be partially replaced by esters of (meth)acrylic acid in particular of C1-C18 alkanols, preferably C1-C8 alkanols. Further, styrene may be replaced to a lesser extent by other vinyl compounds, particularly vinyl esters such as vinyl acetate and vinyl propanoate. With such replacements the condition applies that the styrene content in the polymer component (A) must be at least 20 wt. %, preferably 50 wt. %, particularly at least 90 wt. %, and more particularly at least 99 wt. %.

While the polymer (A) may be very broadly modified by other hydrophobic vinyl compounds, (c.f. R. Vieweg, G. Daumiller, in Kunststoff-Handbuch, Vol. V, Polystyrol, Carl-Hanser-Verlag, Müchen, 1969, pp. 104-108) the proportion of highly polar monomers, e.g., acrylonitrile, maleic anhydride, maleic imides, p-(2-hydroxyhexafluoroisopropyl)-styrene, and allyl alcohol is very limited; namely it should be from 0 to 10 wt. % preferably <5 wt. % of the polystyrene component (A). Particularly preferred are polymers (A) wherein the proportion of these polar monomers is less than 0.1 wt. % most preferred zero wt. %.

Similarly, the cyclohexyl methacrylate in the polymer (B) may be replaced by cyclohexyl acrylate.

The variations will depend on the requirements of the given area of application. Thus, the cyclohexyl acrylate and/or cyclohexyl methacrylate content of a polymer (B) which is to be used in a high weight fraction (e.g., for-modifying the index of refraction of pure polystyrene) will be high, as a rule >20 wt. %, preferably >30 wt. %, and will be substantially higher than the cyclohexyl (meth)acrylate content of a polymer (B) which is intended to be compatible with a polymer (A) required to show compatibility only at room temperature where at higher temperatures a phase separation is provided for.

As a rule, a polymer (A) will still be compatible with a polymer (B) if the polymer (A) also contains cyclohexyl (meth)acrylate and/or the polymer (B) also contains styrene. In the latter case the styrene content of the polymer (A) is substantially greater than that of the polymer (B). As a rule the difference between the two styrene contents percent by weight of styrene in polymer (A) minus percent by weight of styrene in polymer (B) is >10 wt. %, preferably >30 wt. %, particularly >50 wt. %, and more particularly >90 wt. %. Similarly, the cyclohexyl (meth)acrylate content of the polymer (B) is substantially greater than that of the polymer (A), wherewith preferably the content of cyclohexyl (meth)acrylate in the polymer (A) is <5 wt. %, preferably <0.1 wt. %. For cases where the polymer (A) contains cyclohexyl (meth)acrylate, the quotient: content of cyclohexyl (meth)acrylate in the polymer (B)/content of cyclohexyl (meth)acrylate in the polymer (A) is >2, preferably >5, particularly >10.

Further, the content of monomers of Formula I in polymer P2, and the content of styrene in polymer P1, may be low especially if the other monomer units in polymers P1 and P2 are chemically substantially the same.

The methods of characterizing the inventive polymer blends as compatible blends are according to recognized criteria (see Kirk-Othmer, loc, cit., Vol. 18, pp. 457–460):

a) By the optical method, the inventive polymer blends have a single index of refraction, which lies between those of the two polymer components (that of (A) and that of (B));

b) The polymer blends have a single glass transition temperature Tg, which lies between those of the polymer components.

Preparation of the Polymer (A) and the Polymer (B)

The polymers may be prepared by known rules of polymerization and known methods. The polymer (A) can be prepared as per, e.g., Houben-Weyl, "Methoden der organischen Chemie", 4th Ed., Georg Thieme-Verlag, Vol. XIV/1, pp. 761–841 (1961). Such polymers are also commercially available in suitable form. Preferably, radical polymerization is employed, but ionic polymerization may also be employed. The molecular weight M of the polymers according to (A) is generally >3,000, preferably in the range 5,000–1,000,000, particularly in the range 20,000–500,000 (as determined by light scattering). It should be mentioned that the molecular weights do not seem to be a critical factor in determining the suitablity of the polymers as components in the compatible polymer blends. This applies to homo- as well as copolymers of types (A) and (B). A factor which has a certain significance in determining the compatibility of polymers P1 and P2 is the tacticity of the polymers. As a rule, a polymer P2 with a low proportion of isotactic triads (as results from, e.g., radical polymerization) is preferred over a polymer P2 with a high isotactic proportion (as produced by special ionic polymerization).

The homo- and copolymers according to (B) are prepared by known methods (see Rauch-Puntigam, H., and Voelker, Th., 1967, "Acryl- und Methacrylverbindungen", Springer Verlag). Although in principle preparation by anionic polymerization or group transfer polymerization (see also Webster, O. W. et al., 1983, *J. Am. Chem. Soc.*, 105:5706) is possible, radical polymerization is preferred.

The molecular weights M of the polymers (B) are as a rule >3,000, generally in the range 10,000–1,000,000, preferably 20,000–300,000 (as determined by light scattering). In selecting the monomer components to serve as comonomers in the polymer (B), attention should be paid to avoiding a shift in the glass temperature Tg of the resulting polymer whereby the applicability of the overall polymer blend is limited.

Thus, for preparing molded bodies from the polymer blend at least one of the polymers (P1, P2) should have a glass temperature Tg >70° C., and preferably Tg of the blend should be >70° C. Preferably this specification is imposed also for preparation of injection molded, pressed, or extruded objects comprised of the polymer blend. For other applications, e.g., in paints and varnishes, in elastomers, and in reversible thermotropic glazing (employing a polymer blend with a turbidity point upon heating, thus for an application according to Ger. OS 34 36 477.3), polymer blends are preferred which have a polymer component P2 with a glass temperature Tg <40° C., preferably <20° C.

Preparation of the Polymer Blends:

The compatible polymer blends may be prepared by various techniques, for example the following:

Intensive mechanical mixing of the components type (A) and type (B) in the melt, e.g. in an extruder;

preparation from a common solvent, as so-called "solution cast polyblends" (see 1982, Kirk-Othmer, loc. cit., Vol. 18, pp. 443–78).

Also, the polymer (A) can be dissolved in the mixture of the monomers of the other polymer (polymer (B)), following which the polymer (B) is prepared in the presence of the polymer (A). Or alternatively, the polymer (A) can be prepared in the presence of the polymer (B). Also, the polymer blend can be produced with the aid of common precipitating agents (i.e., common to the two components). There are no restrictions on the type of mixture.

As a rule, in producing mixtures of the components, one preferably begins with solids in the form of, e.g., polymer beads or granulate, with the use of a slowly moving mixing apparatus, e.g., a drum mixer, Free-fall-mixer, a spiral mixing wheel, or a double-chamber plow-type mixer. The slowly moving mixer produces mechanical mixing without eliminating phase boundaries (see "Ullmans Encyklopaedie der technischen Chemie", 4th Ed., Verlag Chemie, Vol. 2, pp. 282-311). This is followed by thermoplastic processing by homogeneous mixing in the melt, with the use of heatable mixing apparatus at suitable temperatures (e.g., about 150° C. to about 300° C.), in kneader mixers or preferably in extruders (e.g., single or multiple screw extruders or possibly extruders with oscillating screws and shear rods (e.g. ®Bussco kneaders)).

These methods can be used to produce granulate of uniform particle size (e.g., hot chips, cubic shaped granules, or round granules) in the range 2–5 mm. Another simple method of preparing the polymer blends is mixtures of polymer dispersions containing polymers (A) with polymer dispersions containing polymers (B). These dispersion mixtures can then be coagulated together, spray dried together, or extruded together from an extruder. Alternatively, the dispersion mixtures may be dried to form a film.

Advantageous Properties of the Polymer Blends

The inventive compatible polymer blends have, in particular, the following advantages, which are suggestive of various applications. In this connection, polystyrene and polycyclohexyl (meth)acrylate are indicative of the application possibilities of the polymers (A) and (B):

1) First of all, polymer blends are compatible, in contrast to mixtures of other poly(meth)acrylates and polystyrenes. That is, the inventive polymer blends are highly transparent (no light scattering with the haze being as a rule <10%). According to the invention there are also mixtures which are compatible only at room temperature, and which exhibit de-mixing when the temperature is raised.

2) Mixtures of polystyrenes and polycyclohexyl (meth)acrylates have low water uptake as do polystyrenes and polycyclohexyl (meth)acrylates themselves.

3) The birefringence of polystyrene can be reduced by mixing with polycyclohexyl (meth)acrylate. The two aforementioned properties particularly qualify the inventive polymer blends as data storage materials, particularly for optically readable information storage or display devices (see Hennig, J., 1985, *Kunststoffe*, 75:425).

4) The index of refraction of polystyrenes can also be reduced by mixing with polycyclohexyl (meth)acrylate. That is, polycyclohexyl (meth)acrylate may be used to adjust the index of refraction of polystyrene such that the index of refraction of the polystyrene/-polycyclohexyl (meth)acrylate blend matches that of an embedded rubber phase, so as to enable production of transparent high impact plastics.

Also of substantial interest are polymer compositions comprised of the polymer blend PM in the amount of 40-99 wt. %, preferably 70-95 wt. %, in addition to a third polymer P3 which is chemically different from P1 and P2, and where P3 is present in the amount of 60-1 wt. %, preferably 30-5 wt. %, with polymer P3 being incompatible with P1, P2, and the polymer blend PM.

As a rule the composition of the polymer blend PM is chosen such that the index of refraction of the blend PM coincides with that of the polymer P3, namely $$\uparrow n_{D,PM}^{25} - n_{D,P3}^{25} \uparrow < 0.01,$$

at room temperature.

As a rule, the polymer P3 incompatible with the polymer blend PM has Tg<20° C., and is at least partly covalently linked with at least one of the components (P1 or P2) of the blend PM. Further, the polymer P3 may be crosslinked.

Particularly preferred is the case where the polymer P3 is polybutadiene or polyisoprene.

Polymer compositions comprised of PM in the amount of 40-99 wt. % and P3 in the amount of 60-1 wt. % are distinguished by improved impact strength compared to the pure blend PM; this is particularly the case when P3 has Tg <20° C.

In particular, polymer compositions comprised of PM in the amount of 40-99 wt. % and P3 in the amount of 60-1 wt. % enable ready- production of high impact mixtures of polymer P2. Thus, it is possible to convert brittle P2 into a high impact, clear PM/P3 polymer composition by mixing it with commercially available high impact types of -1 (e.g. styrene-butadiene block copolymer).

5) Polystyrene can be sheathed with polycyclohexyl (meth)acrylate to produce an optical gradient fiber, with the following characteristics:

Core: Polystyrene, with index of refraction $n_D = 1.59$.

Mantle: Polycyclohexyl (meth)acrylate, with index of refraction $n_D = 1.51$.

As a rule, copolymers are used for the mantle, namely copolymers of cyclohexyl (meth)acrylate (e.g., with methyl methacrylate), due to the high brittleness of polycyclohexyl methacrylate; whereby the index of refraction of the mantle is still lower.

Transition: Continuous, representing a polymer blend PM the core complying with the definition of polymer P1, the mantle complying with the definition of polymer P2. Such fibers can be used in e g., light-conductive cables.

6) Objects can be produced comprised of polystyrene with a thin coating comprised of polycyclohexyl (meth)acrylate, particularly with a UV-absorber optionally polymerized in the polycyclohexyl (methacrylate. Such objects are resistant to weathering, in contrast to polystyrene objects not having a coating (c.f. example 27). There is no problem (which would be a serious one if presented) of recyclability of heterogeneous coated plastic wastes, because the wastes can be reincorporated in view of the fact that the resultant mixtures will have good compatibility. As a rule, objects comprised of polystyrene or the polymer blend PM can be fabricated by injection molding, pressing, extruding, rolling, or molding. The coating comprised of polymer P2 is generally applied by painting techniques or by coextrusion.

Those objects can be envisaged as a solid polymer configuration consisting of a first layer of a first polymer according to claim 1, a second layer of a second polymer according to claim 1 and an intermediate layer consisting of a compatible polymer blend comprising.

i) 0.1-99.9 wt. % of a first polymer comprising at least 20 wt. % and up to 100 wt. % of styrene monomer unit.

ii) 99.9-0.1 wt. % of a second polymer comprising at least 10 wt. % and up to 100 wt. % of monomer units of the formula (I)

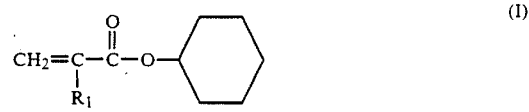

wherein $R_1$ is hydrogen or methyl.

Likewise objects which contain waste material that has been recycled by incorporating it into polymer P1 might be considered as a. solid polymer configuration comprising a first layer consisting of a compatible polymer blend according to claim 1, and a covering layer consisting of the second polymer as in claim 1.

In all those objects the covering layer will preferably contain 0.1-20 wt. % (based on the covering layer) of at least one UV-absorbing agent.

Suitable UV-absorbing agents are described e.g. in Kirk-Othmer Encyclopedia of Chemical Technology, 3rd. Ed., Vol. 23, pp. 615-627, J. Wiley, 1983, and in U.S. Pat. No. 4,576,170.

7) Plates comprised of polystyrene with a coating of polycyclohexyl (meth)acrylate can be produced. Plates having such a structure have light transmittance which is about 2% better than that of uncoated polystyrene plates. As a rule, plates coated with polycyclohexyl (meth)acrylate also have better scratch resistance and an altered corrosion resistance. Particularly interesting are multiple web plates, as used, e.g., in glazing greenhouses, the plates being comprised of polystyrene or a polymer blend PM and coated with a cyclohexyl (meth)acrylate-containing polymer (namely, a polymer P2) (Ger. OS 16 09 777). Further, adhesively bonded objects can be produced with adhesive bonding between polystyrenes and a polymer P2, or advantageously with polystyrenes and monomer/initiator mixtures containing cyclohexyl acrylate. Here the high polymerization rates of the acrylates can be combined with the good polymer compatibility of the inventive systems.

8) There are advantages for mechanical processing technology which result from the use of polymer blends PM comprising polystyrene in the amount of ≧90 wt. % and polycyclohexyl (meth)acrylate in the amount of ≦10 wt. %. In such cases the poly(meth)acrylate serves as a processibility-enhancing adjuvant.

9) Transparent molded products can be produced from blends of polystyrene and polycyclohexyl (meth)acrylate, which are surface modified by application of energy, e.g., in the form of suitable radiation, whereby the poly(meth)acrylate is decomposed and the polystyrene is not. Examples are molded bodies with reflection-reducing surfaces, and resists.

Other features of the invention will become apparent in the course of the following descriptions of exemplary embodiments which are given for illustration of the invention and are not intended to be limiting thereof.

The Vicat softening temperatures were determined according to DIN 53460. The reduced viscosity $\eta_{spec}/C$ was determined based on DIN 1342, DIN 51562, and DIN 7745. The light transmittance was determined according to DIN 5036, unless stated otherwise. The turbidity (haze) is given in per cent (according to ASTM D 1003).

EXAMPLES

Note on synthesis of polymer P2 for Examples 1-25: The monomers were polymerized in oxygen-free atmosphere at 60° C., to a low conversion (about 20 wt. %), with addition of 0.15% azoisobutyronitrile and 0.33% dodecylmercaptan. Then the polymers were precipitated in methanol, were dissolved in methylene chloride, and reprecipitated in methanol, followed by drying in a vacuum dryer.

EXAMPLE 1

Compatible polymer blends PM comprised of polystyrene (polymer P1) and polycyclohexyl methacrylate (polymer P2) were prepared, with compatible polymer films being produced from organic solution.

Polystyrene ($\eta_{spec}/C = 115$ ml/g) was dissolved in toluene to form a 20 wt. % solution. A 20 wt. % solution of polycyclohexyl methacrylate ($\eta_{spec}/C = 29$ ml/g) was also prepared. The solutions were mixed in the ratios indicated in Table 1. Films were cast from these mixtures, and were vacuum dried. The resulting films were evaluated visually.

All the mixtures gave clear, colorless films (see also Table 1).

TABLE 1

Visual evaluation of polystyrene/polycyclohexyl methacrylate mixtures:

| Test Number | Wt. % Polystyrene in the film | Wt. % Polycyclohexyl methacrylate | Visual evaluation of the dried film (+ = homogeneous and clear as glass) |
|---|---|---|---|
| 1a | 98 | 2 | + |
| 1b | 95 | 5 | + |
| 1c | 90 | 10 | + |
| 1d | 80 | 20 | + |
| 1e | 70 | 30 | + |
| 1f | 60 | 40 | + |
| 1g | 50 | 50 | + |
| 1h | 40 | 60 | + |
| 1i | 30 | 70 | + |
| 1j | 20 | 80 | + |
| 1k | 10 | 90 | + |
| 1l | 5 | 95 | + |
| 1m | 2 | 98 | + |

EXAMPLE 2

Compatible polymer blends PM comprised of polystyrene (polymer P1) and polycyclohexyl acrylate (polymer P2) were prepared. Polystyrene ($\eta_{spec}/C = 115$ ml/g) was mixed with polycyclohexyl acrylate ($\eta_{spec}/C = 23$ ml/g) by the method of Example 1. All the resulting blends PM from 98%/2% to 2%/98% showed complete compatibility.

EXAMPLE 3

Testing for compatibility at elevated temperature

Selected samples of compatible polymer blends from Examples 1-4 (20%/80%, 50%/50%, 80%/20%) were heated on a laboratory griddle-type heated surface.

Result: The polymer blends showed compatibility up to T > 250° C. No de-mixing was observed in the range T ≦ 250° C.

EXAMPLES 4 TO 13 (COMPARISON EXAMPLES)

Incompatible polymer mixtures comprised of polystyrene (polymer P1) and polyalkyl (meth)acrylates (polymer P2) were prepared.

The various poly(meth)acrylates were dissolved in toluene as described in Example 1, and were mixed in ratios of 20/80, 50/50, and 80/20 by weight with a 20% solution of polystyrene ($\eta_{spec}/C = 115$ ml/g) in toluene. The polymer films produced were evaluated visually. As seen from Table 2, all the investigated polyalkyl (meth)acrylates with the exception of polycyclohexyl methacrylate and polycyclohexyl acrylate were incompatible with polystyrene.

These comparison examples provide further evidence of the surprising, excellent compatibility of polycyclohexyl methacrylate and polycyclohexyl acrylate with polystyrene, which compatibility also is present in blends prepared in an extruder (see Example 25).

TABLE 2

Investigation of compatibility of polystyrene (= polymer P1) with polyalkyl (meth)acrylates (= polymer P2).

| Example No. | Polymer P2 | Mixture Ratio (percent by weight) Polymer P1/Polymer P2 | | |
|---|---|---|---|---|
| | | 80/20 | 50/50 | 20/80 |
| 4 | Polymethyl methacrylate | − | − | − |
| 5 | Polyethyl methacrylate | − | − | − |
| 6 | Polyisopropyl methacrylate | − | − | − |
| 7 | Poly-n-butyl methacrylate | − | − | − |
| 8 | Polyisobutyl methacrylate | − | − | − |
| 9 | Poly-t-butyl methacrylate | − | − | − |
| 10 | Polyneopentyl methacrylate | − | − | − |
| 1 | Polycyclohexyl methacrylate | + | + | + |
| 3 | Polycyclohexyl acrylate | + | + | + |
| 11 | Poly-3,3,5-trimethylcyclohexyl methacrylate | − | − | − |
| 12 | Poly-3,3,5-trimethylcyclohexyl acrylate | − | − | − |
| 13 | Polyisobornyl methacrylate | − | − | − |

−: Incompatible, giving a turbid, de-mixed film.
+: Compatible, clear and homogeneous.

EXAMPLE 14

Preparation of molded bodies from a mixture of polystyrene and polycyclohexyl methacrylate 20 parts polycyclohexyl methacrylate ($\eta_{spec}/C = 29$ ml/g) was mixed with 80 parts polystyrene ($\eta_{spec}/C = 115$ ml/g) in an extruder. A highly transparent granulate was produced, and used to produce injection molded pieces (dimensions 50×30×3 mm). The injection molded pieces had light transmittance L=93.5 measured on a Hunter Laboratories color measurement device. The haze was 6.0%. Vicat softening temperature was 101° C.

EXAMPLE 15

The method was the same as in Example 14 except that the mixture ratio chosen was 50/50. The injection molded pieces produced were highly transparent, with light permeability L =94.82. Haze =4.4%. Vicat softening temperature =101° C.

EXAMPLE 16

Preparation of molded bodies from a mixture of polystyrene and 55/45 copolymer of cyclohexyl methacrylate and methyl methacrylate The method was as in Example 15 except for the selection of P2.
The injection molded piece was highly transparent.

EXAMPLE 17

Coating of a polystyrene plate with a polymer P2

A monomer mixture comprised of methyl methacrylate, cyclohexyl methacrylate, and methyl acrylate was polymerized to a conversion of less than 40%, and the resulting polymer was isolated. The composition of the polymer was 57% methyl methacrylate, 33% cyclohexyl methacrylate, and 10% methyl acrylate. Its molecular weight was about 100,000. A 15% solution of this terpolymer in diacetone alcohol / 1-methoxy-2-propanol (1/1) was prepared, to which 2-hydroxy-4-n-octyloxybenzophenone in the amount of 0.1 wt. % was added as a UV absorber. A 3 mm thick plate of polystyrene measuring 20×20 cm was dip-coated with this coating (40 cm/min), followed by drying 2 hr at 90° C.

The result was a clear plate which had 2% higher light permeability than the original plate. Also, the coated plate had much improved wiping resistance.

EXAMPLE 18

Reprocessing of wastes

Standard polystyrene was mixed with ground plate wastes from coated plates according to Example 17, the wastes being added in the amount of 20 wt. %. This mixture was extruded to form clear plates 3 mm thick. The plates were coated with a 15% solution of the UV-absorber-containing coating (polymer P2) as in Example 17. The properties of the resulting plates corresponded to those of the plates produced according to Example 17.

EXAMPLE 19

Synthesis of a polymer blend PM with a cloud point 200 g of the polymer P2 described in Example 17 was dissolved in a mixture comprised of
  800 g styrene,
  0.5 g azoisobutyronitrile,
  0.5 g 1,1'-azobis(cyclohexane-1-nitrile), and
  5 g t-dodecylmercaptan.
Polymerization was carried out to form a plate 3 mm thick (96 hr at 50° C., followed by 10 hr at 90° C.).

The result was a highly transparent plate which remained clear upon heating to at least 150° C. Brief heating to >200° C. led to turbidity, which could be frozen in by chilling.

This affords the possibility of using this polymer blend in a system for optical data storage, usable analogously to the manner described in Ger. OS 34 36 476.5.

EXAMPLE 20

Synthesis of a polymer blend with low glass temperature

Polystyrene ($\eta_{spec}/C = 22$ ml/g) was mixed in the amount of 10 wt. % to form a solution in the following mixture, with the following mixture being present in the amount of 90 wt. %:
  20 parts by wt. butyl acrylate,
  80 parts by wt. cyclohexyl acrylate, and
  0.1 part by wt. 1,1,1-tris(hydroxymethyl)propane triacrylate, with
  added bis(4-t-butylcyclohexyl)peroxydicarbonate.
The result was a highly transparent rubber.

EXAMPLE 21

Synthesis of a polymer blend PM with low glass temperature and a cloud point

The procedure was as in Example 20, except that a different monomer complement was chosen, as follows (units in parts by weight):
  30 parts butyl acrylate,
  70 parts cyclohexyl acrylate, and 0.1 part 1,1,1-tris(hydroxymethyl)propane triacrylate.

The result was a highly transparent rubber which became turbid upon heating.

EXAMPLE 22

Synthesis of a polymer blend PM with high concentration of methyl methacrylate

A copolymer (polymer P1) of the following monomer composition was dissolved in toluene to form a 20 wt. % solution:

60 wt. % methyl methacrylate, and
40 wt. % styrene ($\eta_{spec}/C = 19$ ml/g).

Also, a copolymer (polymer P2) of the following monomer composition was dissolved in toluene to form a 20 wt. % solution:

60 wt. % methyl methacrylate, and
40 wt. % cyclohexyl methacrylate ($\eta_{spec}/C = 18$ ml/g).

The two solutions were mixed in ratios of 19:1, 3:1, 1:1, 1:3, and 1:19. Films were prepared from the resulting mixtures.

All the films were colorless and clear. No de-mixing occurred when they were heated to 260° C.

EXAMPLE 23

Phase diagram of a polymer blend PM comprised of polystyrene (polymer P1) and a copolymer (polymer P2) comprised of the monomers methyl methacrylate in the amount of 80 wt. % and cyclohexyl methacrylate in the amount of 20 wt. %

Polymethyl methacrylate is incompatible with polystyrene. Polycyclohexyl methacrylate is compatible with polystyrene. By copolymerizing methyl methacrylate with cyclohexyl methacrylate, a polymer system with a LCST can be prepared, namely a system which shows compatibility at low temperatures but not at high temperatures.

EXAMPLE 24

Polystyrene ($\eta_{spec}/C = 19$ ml/g) was mixed with a copolymer of methyl methacrylate (in the amount of wt. %) and 20 wt. % cyclohexyl methacrylate ($\eta_{spec}/C = 18$ ml/g), in the manner described in Example 1 with various mixing ratios. The products were clear films, which exhibited a cloud point (with de-mixing) upon heating. The compositions of the polymer blends and the observed cloud points are given in Table 3.

TABLE 3

Turbidity points of polystyrene blends with 80/20 copolymer of methyl methacrylate and cyclohexyl methacrylate:

| | Composition of the polymer blend, wt. % | | |
|---|---|---|---|
| Example No. | Polystyrene | Copolymer of methyl methacrylate and cyclohexyl methacrylate | cloud point, °C. |
| a | 95 | 5 | 113 |
| b | 75 | 25 | 89 |
| c | 50 | 50 | 105 |
| d | 25 | 75 | 117 |
| e | 5 | 95 | 151 |

The positions of the cloud points (de-mixing points) may be shifted as desired, via minor changes in the composition of the copolymer.

These polymer blends are suitable for data storage plates according to German Patent Application P 34 36 476.5.

EXAMPLE 25

Mixing of two molding compositions with low water uptake

Polymer P1: Copolymer of 60 wt. % methyl methacrylate and 40 wt. % styrene ($\eta_{spec}/C = 50$ ml/g).

Polymer P2: Copolymer with following monomer composition

Methyl methacrylate, 57 wt. %;
Cyclohexyl methacrylate, 33 wt. %; and
Methyl acrylate, 10 wt. %.

The polymers P1 and P2 were mixed together in an extruder, in ratios 25:75, 50:50, and 75:25 by weight. The extrudates were highly transparent, for all three blends.

These polymer blends PM are particularly suitable for data storage plates for optically readable data.

Conclusions

The Examples demonstrate the excellent compatibility shown by the blends of polycyclohexyl (meth)acrylate and polystyrene, whereby one can make various polymers compatible with polystyrene, including polycyclohexyl (meth)acrylate (which alone is brittle and therefore economically unimportant) as well as other polymers—particularly poly(meth)acrylates—wherewith the technique with the other polymers is to modify them slightly with polycyclohexyl (meth)acrylate.

If for reasons of cost only one will keep the content of cyclohexyl (meth)acrylate in the polymer P2 as low as possible. This condition is satisfied in one of the most important areas of application of the invention, namely surface protection of polystyrene by, e.g., coating it with a polymer P2. Very small amounts of P2 are required, e.g., 0.5 wt. % on the basis of the weight of the polymer P1. Accordingly, when the product is recycled (as waste) only small amounts of polymer P2 will be mixed into polymer P1.

As illustrated in Example 23, in the case of highly unsymmetric mixing ratios (e.g., 1 wt. % P2 in 99 wt. % P1) the requirement of compatibility is not stringent, and thus the required content of cyclohexyl (meth)acrylate in polymer P2 is small (e.g., <20 wt. %).

Whereas the content of cyclohexyl (meth)acrylate in polymer P2 is kept as small as possible, it is preferred to have the highest possible content of polystyrene in polymer P1, in particular pure polystyrene or high impact polystyrene (see Vieweg and Daumiller, 1969, "Kunststoff-Handbuch", Vol. V—"Polystyrol", Carl Hauser, Munich).

EXAMPLE 26

Data storage medium based on an inventive polymer blend

Materials:

Substrate: Extruded polymethyl methacrylate plate 3 mm thick (Plexiglas XT ®, supplied by Roehm GmbH).

Polymers:

Polymer 26a: Copolymer of methyl methacrylate (in the amount of 78 wt. %), cyclohexyl methacrylate (20 wt. %), and cyclohexyl acrylate (2 wt. %).

Reduced specific viscosity: $\eta_{spec}/C = 48.4$ ml/g.
Index of refraction: $n_D^{20} = 1.49$.
Polymer 26b: Polystyrene.
Reduced specific viscosity: $\eta spec/C = 23.4$ ml/g.
Index of refraction: $n_D^{20} = 1.59$.

Manufacturing Method

The polymethyl methacrylate plate was immersion coated with a 15 wt. % solution of Polymer 26a in a 1:1 by wt. mixture of toluene and o-xylene, followed by drying at 80° C. and a second coating with the said coating solution. Then the following mixture was applied, dissolved in toluene/o-xylene:
Polymer 26a, 30 parts by wt.,
Polymer 26b, 70 parts by wt., and
Makrolexrot GN 1-Methylaminoanthraquinone, Solvent Red 111 2 parts by wt. (Color Index 60505).
After this red-dyed polymer blend was dried, another coating of the above-described solution comprised solely of Polymer 26a was applied.

The result was a highly transparent, intensely red colored plate. Recording of information on such a plate may be accomplished by local heating to 130° C.

Figure 1:
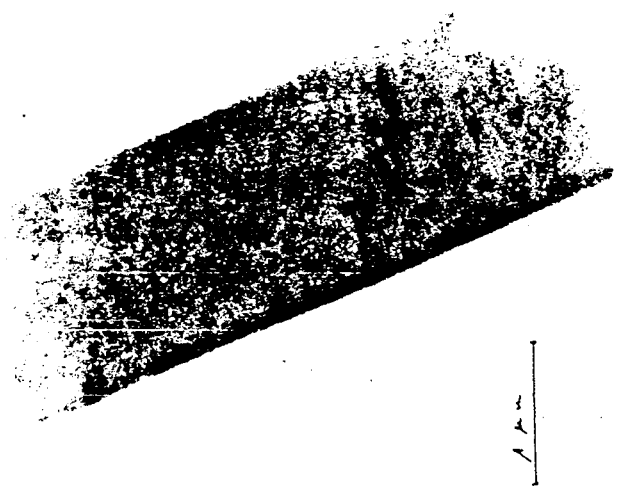
FIG. 1 shows a cross-section of the coated plate of Example 26.

FIG. 1 shows a cross section of the coated plate of Example 26. As can be readily seen from this electron micrograph, the polymer blend is completely homogeneous.

Figure 2:
FIG. 2 shows a cross-section of a region of the plate of FIG. 1 which has been heated to 130° C.

FIG. 2 shows a cross section of a region of the plate of FIG. 1 which has been heated to 130° C. As seen, the two polymers have de-mixed, thereby exhibiting incompatibility.

EXAMPLE 27

Protecting polymer P1 against weathering by coating it with a coating comprising a polymer P2 containing a light-protective agent Polymer P2 was applied by painting-on, as a 20 wt. % solution, to a 3 mm thick extruded plate comprised of polymer P1 (Polystyrol 158K ®, provided by BASF).

Polymer P2: A copolymer of methyl methacrylate, 49 wt. %, cyclohexyl methacrylate, 49 wt. %, and cyclohexyl acrylate ($\eta_{spec}/C = 36$), 2 wt. %.

Solvent: A mixture comprised of 2-propanol, 40 wt. %; 4-hydroxy-4-methyl-2-pentanone, 40 wt. %; and methyl ethyl ketone, 20 wt. %.

Light-protective agent: Present in amount of 10 wt. % (based on weight of polymer P2):
For Sample C: 2-hydroxy-4-methoxybenzophenone. Layer thickness about 10 micron.
For Sample D: Same light-protective agent. Layer thickness about 20 micron.
For Sample H: 2-(2'-hydroxy-5'-t-octylphenyl)-benzotriazole. Layer thickness about 10 micron.

Adhesion of the coating was very good in all cases (no removal in the Tesafilm test). Sample L was an uncoated comparison sample.

The coated polystyrene plates and the uncoated control were subjected to accelerated weathering.

Conditions: Xeno test. Limiting wavelength nm (according to DIN 53 387). Time 1,000 hr.

The exposed surface of the unprotected polystyrene plate (Sample L) was thoroughly damaged after the 1,000 hr. The samples coated with polymer P2 containing UV-protective agent were completely unaltered even after the 1,000 hr Xeno test.

EXAMPLE 28

Partially compatible polymer mixture with low glass temperature

Synthesis of polymer P28a 900 g toluene, 240 g butyl acrylate, 60 g cyclohexyl acrylate, and 9 g dodecylmercaptane were heated in a flask to 60° C., under argon. A solution of 3 g t-butylperneodecanoate in 17 g toluene was added to the mixture in 4 portions separated by about 20 min. intervals. After 4 hr total reaction time, the polymer was precipitated in methanol and dried.
Synthesis of polymer P28b A mixture comprising 20.0 g butyl acrylate, 80.0 g styrene, 0.6 g t-dodecylmercaptane 0.2 g azoisobutyronitrile, and 0.1 g 1,1'-azobis(cyclohexane-l-nitrile) was polymerized 24 hr at 50° C., followed by precipitation in methanol and drying.

Polymers P28a and P28b were dissolved in toluene and were mixed together in various proportions. Films were cast from these mixtures. All the films were highly transparent. When they were heated above a specific temperature (e.g., about 110° C., for a 1:1 by wt. mixture), turbidity developed, which disappeared upon cooling below the specific de-mixing temperature.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A polymer composition, consisting essentially of:
   (i) 40-99 wt. % of a miscible two component polymer blend, containing 0.1-99.9 wt. % of a first polymer comprising 90-100 wt. % styrene monomer units, and 99.9-0.1 wt. % of a second polymer comprising 10-100 wt. % of monomer units having formula (I):

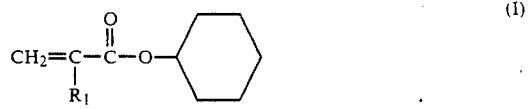

wherein $R_1$ is hydrogen or methyl; and
   (ii) 60-1 wt. % of a third polymer, wherein said third polymer is chemically different from said first polymer and said second polymer, and wherein said third polymer is non-miscible with said first polymer, said second polymer and said polymer blend.

2. The polymer composition of claim 1, wherein said second polymer comprises 20-90 wt. % of monomer units of formula (I).

3. The polymer composition of claim 1, wherein said second polymer comprises:
   (a) 10-90 wt. % of monomer units having formula (I), and
   (b) 90-10 wt. % of acrylic acid esters, methacrylate acid esters of $C_{1\text{-}12}$ nonalicyclic alcohols, optionally substituted cyclic alkanols having 4-5 or 7-12 carbon atoms in the ring, $C_{7\text{-}12}$ substituted cyclohexanols or mixtures thereof.

4. The polymer composition of claim 1, wherein said second polymer comprises:
   (a) 10-90 wt. % methylmethacrylate, and (b) 90–10 wt. % monomer units having formula (I).

5. The polymer composition of claim 1, wherein said first polymer comprises 1–20 wt. % monomer units of formula (II):

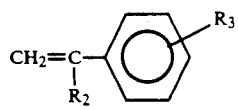

wherein $R_2$ is hydrogen or methyl, and $R_3$ is a $C_nH_{2n+1}$ alkyl group wherein $n=1-8$.

6. The polymer composition of claim 1, wherein at least one of said first and second polymers has a glass transition temperature $Tg>70°$ C.

7. The polymer composition of claim 1, wherein said second polymer has a glass transition temperature $Tg>20°$ C.

8. The polymer composition of claim 1, wherein said polymer blend has a cloud point when heated.

9. The polymer composition of claim 1, wherein said polymer blend has a cloud point greater than 24° C.

10. The polymer composition of claim 1, wherein said polymer blend has a cloud point greater than 60° C.

11. The polymer composition of claim 1, wherein said polymer blend has a cloud point greater than 180° C.

12. The polymer composition of claim 1, wherein the index of refraction of said polymer blend and said third polymer have the following relationship $$\uparrow n_{D,PM}{}^{25} - n_{D,P3}{}^{25} \uparrow < 0.01.$$

13. The polymer composition of claim 1, wherein said third polymer has a glass temperature $Tg<20°$ C.

14. The polymer composition of claim 1, wherein said third polymer is at least partially covalently bonded to said first polymer or said second polymer.

15. The polymer composition of claim 1, wherein said third polymer is cross-linked.

16. The polymer composition of claim 1, wherein said third polymer is polybutadiene or polyisoprene.

* * * * *